United States Patent
Yadid-Pecht et al.

(10) Patent No.: US 6,980,230 B2
(45) Date of Patent: Dec. 27, 2005

(54) CENTER OF MASS DETECTION VIA AN ACTIVE PIXEL SENSOR

(75) Inventors: Orly Yadid-Pecht, Haifa (IL); Brad Minch, Pasadena, CA (US); Bedabrata Pain, Los Angeles, CA (US); Eric Fossum, La Crescenta, CA (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 413 days.

(21) Appl. No.: 10/289,509

(22) Filed: Nov. 5, 2002

(65) Prior Publication Data

US 2003/0063818 A1 Apr. 3, 2003

Related U.S. Application Data

(62) Division of application No. 09/114,347, filed on Jul. 13, 1998, now Pat. No. 6,476,860.
(60) Provisional application No. 60/052,400, filed on Jul. 14, 1997.

(51) Int. Cl.$^7$ .............................................. H04N 5/225
(52) U.S. Cl. ....................................... 348/172; 348/302

(58) Field of Search .............................. 348/169, 170, 348/171, 172, 302; H04N 5/225

(56) References Cited

PUBLICATIONS

M. Tartagni and P. Perona; Computing centroids in current-mode technique; Aug. 5, 1993; IEE, Electronics Letters Online No. 19931188.

*Primary Examiner*—Young Lee
(74) *Attorney, Agent, or Firm*—Fish & Richardson P.C.

(57) ABSTRACT

An imaging system for identifying the location of the center of mass ("COM") in an image. In one aspect, an imaging system includes a plurality of photosensitive elements arranged in a matrix. A center of mass circuit coupled to the photosensitive elements includes a resistive network and a normalization circuit including at least one bipolar transistor. The center of mass circuit identifies a center of mass location in the matrix and includes: a row circuit, where the row circuit identifies a center of mass row value in each row of the matrix and identifies a row intensity for each row; a horizontal circuit, where the horizontal circuit identifies a center of mass horizontal value; and a vertical circuit, where the vertical circuit identifies a center of mass vertical value. The horizontal and vertical center of mass values indicate the coordinates of the center of mass location for the image.

1 Claim, 4 Drawing Sheets

CENTER OF MASS DETECTION VIA AN ACTIVE PIXEL SENSOR

CROSS-REFERENCE TO RELATED APPLICATIONS

This application is a divisional application of and claims priority to U.S. application Ser. No. 09/114,347, filed on Jul. 13, 1998 now a U.S. Pat. No. 6,476,860, which claims the benefit of U.S. Provisional Application No. 60/052,400, filed on Jul. 14, 1997, which is incorporated herein by reference.

STATEMENT AS TO FEDERALLY SPONSORED RESEARCH

The invention described herein was made in the performance of work under a NASA contract, and is subject to the provisions of Public Law 96-517 (35 U.S.C. 202) in which the Contractor has elected to retain title.

TECHNICAL FIELD

The present disclosure relates to image analysis, and more particularly to identifying the center of mass in an image.

BACKGROUND

Tracking of an item of interest in the image is desirable in various imaging applications. For example, in controlling the position of a camera for star tracking, the camera may adjust to center on a star. Similarly, it may be desirable for a camera for video conferencing to track a moving object such as a speaker. In order to track the item, an imaging system typically analyzes a captured frame of image data to determine the location of the center of mass ("COM") or centroid of the image. In an image, the COM is the location in the image which corresponds to the average light intensity, weighted by location. The camera then typically tracks that COM location.

In imaging systems which use an active pixel sensor ("APS") for image capture, the APS is typically fabricated with a CMOS process. However, conventional CMOS sensor imaging systems which identify the COM are typically limited in their imaging capability.

In research by Shibata, capacitor scaling was used for identifying the COM in a relatively small number of inputs, such as 25 inputs. However, capacitor scaling for a large number of inputs, such as in a large image, using this technique is not very practical.

In research by Deweerth and Mead, a 1D photoreceptor array which computed the COM in an analog circuit was introduced. Deweerth proposed a 2D extension of this array in which the receptors were alternated spatially so that the currents from adjacent receptors were added to opposing axes. The resolution was limited in the 2D case to be half of that of the 1D case. In addition, the circuitry for calculating the COM resided in each pixel and contributed to both axes. Thus, the fill factor was lower than in the 1D case.

Furthermore, the circuit only tracked the COM, regular readout imaging was not available through the same imager.

SUMMARY

The present disclosure describes apparatus and techniques for identifying the location of the center of mass ("COM") in an image. In one aspect, an imaging system includes a plurality of photosensitive elements arranged in a matrix of M columns and N rows, where M>1 and N>1; a center of mass circuit coupled to the photosensitive elements, including a resistive network and a normalization circuit including at least one bipolar transistor. The center of mass circuit identifies a center of mass location in the matrix and includes: a row circuit, where the row circuit identifies a center of mass row value in each row of the matrix and identifies a row intensity for each row; a horizontal circuit, where the horizontal circuit identifies a center of mass horizontal value relative to the matrix based upon the center of mass row values, such that the center of mass horizontal value indicates the horizontal coordinate of the center of mass location; and a vertical circuit, where the vertical circuit identifies a center of mass vertical value relative to the matrix based upon the row intensities, such that the center of mass vertical value indicates the vertical coordinate of the center of mass location.

An advantage of the techniques described herein is that the circuitry for identifying the COM is provided on the periphery of the imager so that regular imaging is possible without degradation from the COM circuitry. Also, the COM may be identified without reading out the entire frame of image data.

DETAILED DESCRIPTION

The center of mass ("COM") in an image may be described as the sum over all locations of light intensity at a location multiplied by the relative location. Thus, the COM is a weighted average of brightness, according to location. The present disclosure provides apparatus and techniques for identifying the COM for an image as a whole by calculating a row COM for each row in an image as well as the total brightness or intensity for each row. The results for the rows are superposed and a horizontal COM is calculated for that superposed value. The horizontal COM is the COM for the image as a whole in the horizontal direction. Similarly, a vertical COM of the row intensities is calculated. The vertical COM is the COM for the image as a whole in the vertical direction. The horizonal COM and the vertical COM indicate the COM for the image as a whole.

A COM circuit according to the present disclosure calculates the COM for a set of inputs by generating a voltage proportional to the COM location in the set of inputs. As noted above, three COM circuits may be included in an imaging system: a row COM circuit, a horizontal COM circuit, and a vertical COM circuit. The COM circuits may be positioned on the periphery of an imager, such as a matrix of photosensitive elements. By placing the COM circuits on the periphery, the image produced by the imager is not detrimentally affected by the COM circuits. Accordingly, the imaging system may operate in two modes: an imaging mode or a COM mode.

Figure 1:
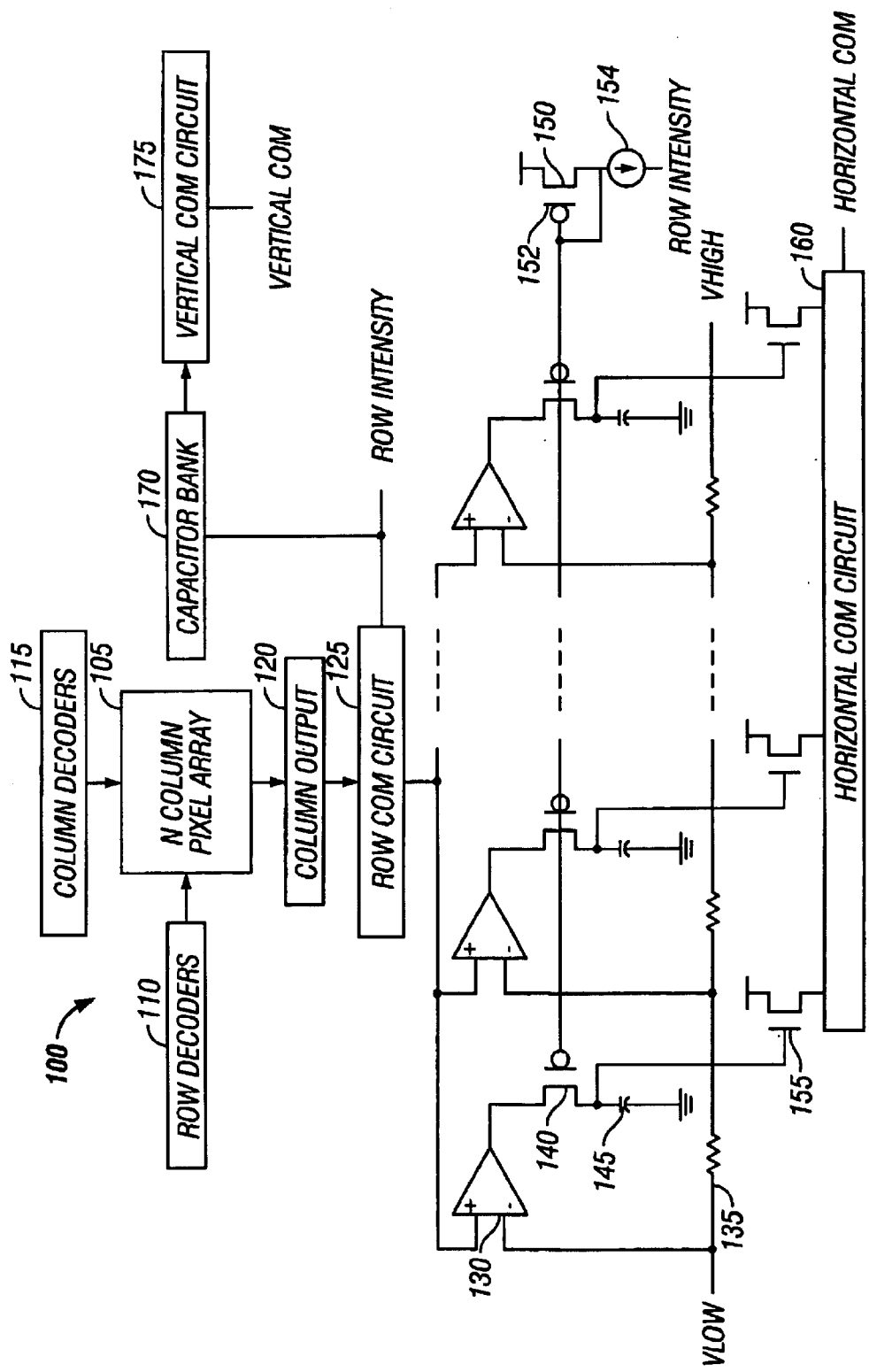
FIG. 1 is a diagram of an architecture of an imaging system according to the present disclosure.

As shown in FIG. 1, one embodiment of an imaging system 100 includes a matrix 105 of photosensitive elements. Matrix 105 may be connected to and receive image information from a lens (not shown). Imaging system 100 may be included in an image capturing device such as a camera. The matrix is preferably an active pixel sensor ("APS") including APS photogates. The configuration and operation of an APS is described in U.S. Pat. No. 5,471,515 to Fossum et al., the disclosure of which is incorporated herein.

Matrix 105 is connected to a row decoder 110 and a column decoder 115 for controlling the elements of matrix 105. Matrix 105 is also connected to a column output circuit 120. An element in matrix 105 is indicated by the intersection of a row selected by row decoder 110 and a column selected by column decoder 115. Row decoder 110 and column decoder 115 may select elements in a left to right and top to bottom order. For example, row decoder 110 first may select the uppermost row of matrix 105 and column decoder 115 may select the leftmost column of matrix 105, indicating the element in the upper left corner of matrix 105. Next, column decoder 115 may select the column to the right of the previously selected column, while row decoder 110 is held constant, and so on throughout matrix 105.

Alternatively, row decoder 110 and column decoder 115 may indicate elements in a random access manner, i.e., not only by accessing an entire row at a time. By accessing elements in this way, a "window" within matrix 105 may be accessed. This window may be of any size or shape within matrix 105. The window may be a square or any other shape, not necessarily contiguous, formed from a collection of elements indicated by row decoder 110 and column decoder 115. In addition, the window may vary. For example, as a first pass, all the elements in matrix 105 may be accessed. In a second pass, a window of some subset of elements in matrix 105 may be accessed surrounding a point of interest in the image.

The indicated element sends an image signal to column output circuit 120. This image signal represents the portion of the image captured by imaging system 100 corresponding to the indicated element of matrix 105. Column output circuit 120 stores the image signals from each element in the selected row. When no more elements in the selected row are to be accessed, column output circuit 120 sends the signals to a row COM circuit 125. Where matrix 105 is an APS, the photogate row voltages are converted to currents and sent to row COM circuit 125 by converter circuits (not shown). Alternatively, the row voltages may be converted into currents in row COM circuit 125.

Figure 2:
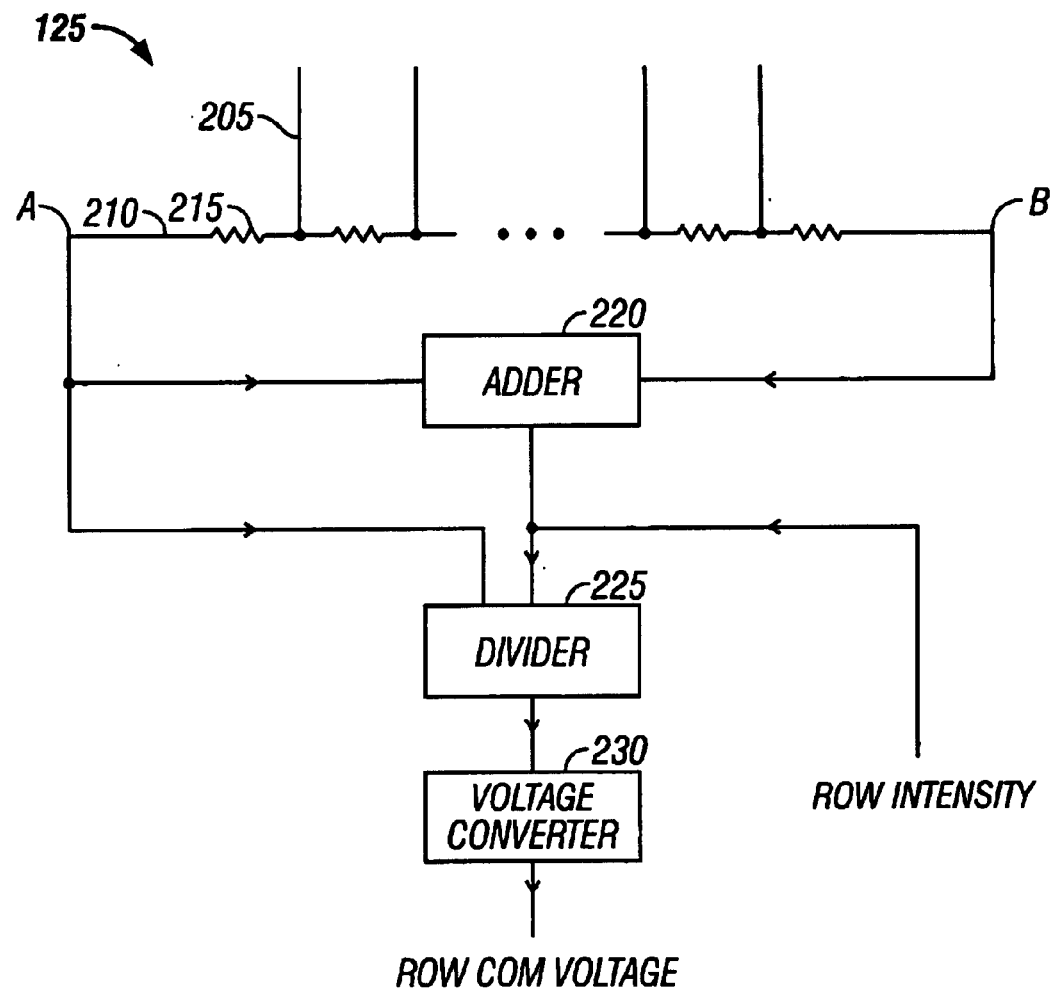
FIG. 2 is a block diagram of a center of mass circuit according to the present disclosure.

Row COM circuit 125 identifies the location of the COM for the selected row in matrix 105. As shown in FIG. 2, row COM circuit 125 includes a plurality of current lines 205. Each current line 205 supplies a current for each column in matrix 105 to a resistive network 210, such as a resistor string 210. Resistor string 210 includes a plurality of resistors 215 joined in series. Resistor string 210 may include one resistor 215 for each current line 205. Each current line 205 is connected to resistor string 210 adjacent to a corresponding resistor 215. Thus, current lines 205 and resistor string 210 form a multiple input current divider. In order for the current divider to function properly, the voltage potentials at node A and node B preferably maintain the same potential.

In an alternative implementation, resistor string 210 includes MOSFETs instead of resistors. The gate electrode of each MOSFET is connected to a common reference voltage. Each current line 205 is connected to a source and drain between corresponding MOSFETs. The resulting functionality is substantially equivalent to that of the simple resistor string 210 described above. Performance and cost effectiveness may improve, however.

All of the current supplied from column output circuit 120 through current lines 205 flows through resistor string 210 and is divided between node A and node B. Accordingly, the sum of the current at node A and at node B is equal to a current representing the total light intensity for the selected row. A summation circuit 220 adds the current at node A and the current at node B to calculate a row intensity current. The row intensity current is stored in a corresponding capacitor in a bank of capacitors 170 and also supplied to a current mirror 150, shown in FIG. 1, as described below.

A divider circuit 225 divides the current at node A by the row intensity current to generate a row COM current indicating the row COM location. The row COM current varies from 0 to 1 and is proportional to the location of the COM in the selected row. For example, if the row COM current is 0.5, the COM is approximately in the center of the row. The row COM current may indicate a non-integer value. A voltage converter 230 converts the row COM current to a row COM voltage which is output by row COM circuit 125.

An implementation of a conventional COM circuit is described by Tartagni and Perona in "Computing Centroids in Current-mode Technique" in *Electronics Letters*, Vol. 29, No. 21, pp. 1811–13, October, 1993, the disclosure of which is herein incorporated by reference. However, Tartagni's COM circuit provides a value which is normalized such that 0 is at the center of the resistor string. The present disclosure considers it desirable to have 0 correspond to the left edge of the source of inputs. Therefore, it is desirable to construct a variation of Tartagni's COM circuit to produce a different normalization. In addition, Tartagni's COM circuit operates in the subthreshold regime of the transistors. Transistors operating above the subthreshold level may have an improved performance speed and be generally more desirable. Accordingly, bipolar lateral or vertical transistors are preferred in an embodiment according to the present disclosure.

Figure 3:
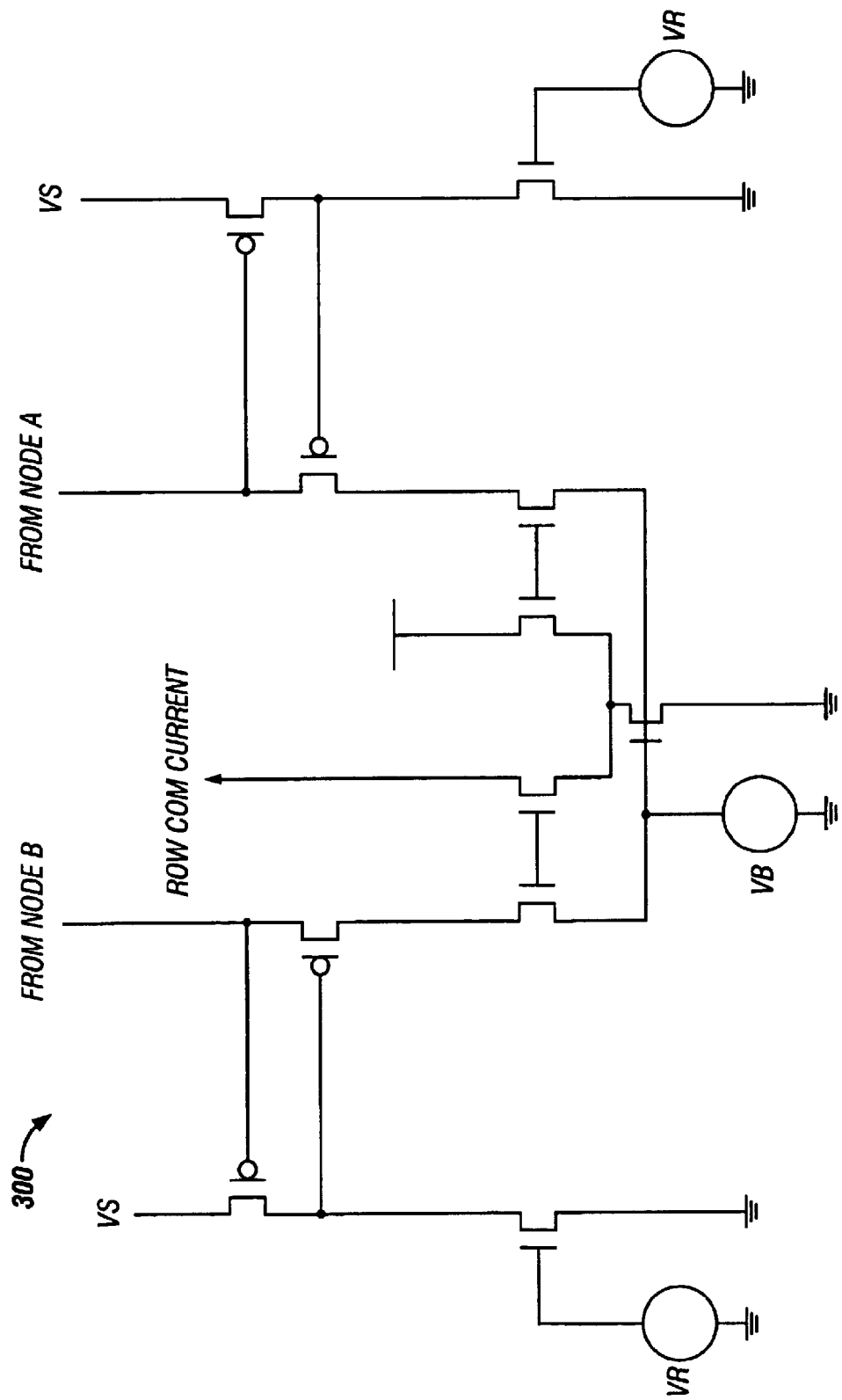
FIG. 3 is a diagram of an implementation of a center of mass circuit.

Accordingly, as shown in FIG. 3, in one implementation, a single circuit 300 for generating the row COM current may be implemented using transistors. This circuit 300 is a variation of the circuit described by Tartagni. To normalize the row COM current to a value starting from 0, the current from node A is divided by the sum of the current from node A and the current of node B, as described above. Tartagni, by contrast, divides the difference between the current from node B and the current from node A by the sum of the current from node A and the current from node B. The voltage potentials VS, VR, and VB are described in more detail by Tartagni.

Returning to FIG. 1, the row COM voltage for each row is sent to a bank of high-gain comparators 130, such as differential operational amplifiers. Each comparator 130 includes additional connections, such as for power and ground, which are not shown. The row COM voltage is supplied to a positive input of each comparator 130. Each comparator 130 is connected to a resistor series 135. Resistor series 135 includes a number of resistors connected in series. The number of resistors in resistor series 135 may be the same as the number of columns in matrix 105, in which case each comparator 130 has a corresponding resistor in resistor series 135. A voltage differential from VLOW to VHIGH is connected to resistor series 135, such that the resistors of resistor series 135 linearly interpolate the voltage difference. VLOW may be 0 and VHIGH may be the maximum row COM voltage.

A negative input of each comparator 130 is connected to resistor series 135 before the corresponding resistor in resistor series 135. For example, as shown in FIG. 1, the leftmost comparator 130 is connected to resistor series 135 before the leftmost resistor in resistor series 135. Thus, the negative input of each comparator 130 receives an increasingly larger voltage, progressing from left to right in FIG. 1.

Comparator 130 rails to a high output voltage when the voltage at the positive input is greater than the voltage at the negative input. Conversely, comparator 130 rails to a low output voltage, such as ground, when the voltage at the negative input is greater than the voltage at the positive input. Comparators 130 may be strobe comparators, such that a high output is only generated during a strobe cycle. The output from each comparator 130 is supplied to a source of a PMOS transistor 140. The drain of each transistor 140 is connected to a capacitor 145. The gate electrode of each transistor 140 is supplied with a current based upon the row intensity current of the selected row from row COM circuit 125.

A current mirror 150 is formed from a transistor 152 and a current source 154. Current mirror 150 also receives as input a reference voltage at the source of transistor 152 and the row intensity current at the drain of transistor 152. Current mirror 150 outputs a current proportional to the row intensity current to the gate electrode of each PMOS transistor 140.

When a comparator 130 outputs a high output voltage, the corresponding PMOS transistor 140 is "on" and a current proportional to the current supplied to the gate electrode of the PMOS transistor 140 is output from the drain. Thus, the output current is in turn proportional to the row intensity current. When a comparator 130 outputs a low output voltage, the corresponding PMOS transistor 140 is "off" and no current flows from the drain.

The drain of each PMOS transistor 140 is connected to a corresponding capacitor 145. Each capacitor 145 stores a charge from the current supplied from the corresponding PMOS transistor 140. Each capacitor may accumulate charge as row COM circuit 125 outputs a row COM voltage for each row. Thus, for each row COM voltage, capacitors 145 connected to PMOS transistors 140 connected to comparators 130 where the row COM voltage exceeds the corresponding voltage from resistor series 135 accumulate charge. In effect, the bank of capacitors 145 "superpose" the results of calculating the row COM value for each row.

Capacitor 145 is also connected to the gate electrode of a corresponding row transistor 155. The source of row transistor 155 is connected to a reference voltage. The drain of row transistor 155 is connected to a horizontal COM circuit 160. Row transistors 155 serve as buffers between capacitors 145 and horizontal COM circuit 160. Thus, horizontal COM circuit 160 receives input based upon the accumulated row COM voltages stored as charge in capacitors 145.

Horizontal COM circuit 160 is constructed similarly to row COM circuit 125. Horizontal COM circuit 160 converts the supplied voltages to currents and generates a horizontal COM voltage based on the accumulated voltages from each of the rows accessed in matrix 105. The horizontal COM voltage indicates the relative horizontal location of the COM for the entire frame.

A charge based on the row intensity current for each row is stored in a corresponding capacitor in a bank of capacitors 170, as described above. After each row has been accessed and a corresponding row intensity current has been generated, capacitor bank 170 stores a charge for each row. A corresponding voltage is input to a vertical COM circuit 175 for each row. Vertical COM circuit, similar to row COM circuit 125 and horizontal COM circuit 160, converts the voltages to currents and generates a vertical COM voltage. The vertical COM voltage indicates the relative vertical location of the COM for the entire frame.

The horizontal COM voltage and the vertical COM voltage together indicate the location of the COM for the frame as a whole. While the description above focuses on reading out each row and column of matrix 105, as described above, a subset of the elements in matrix 105 may be selected to form a sub-sample or window. In such a case, a similar process is used with a smaller set of inputs to generate a local COM for that window.

Figure 4:
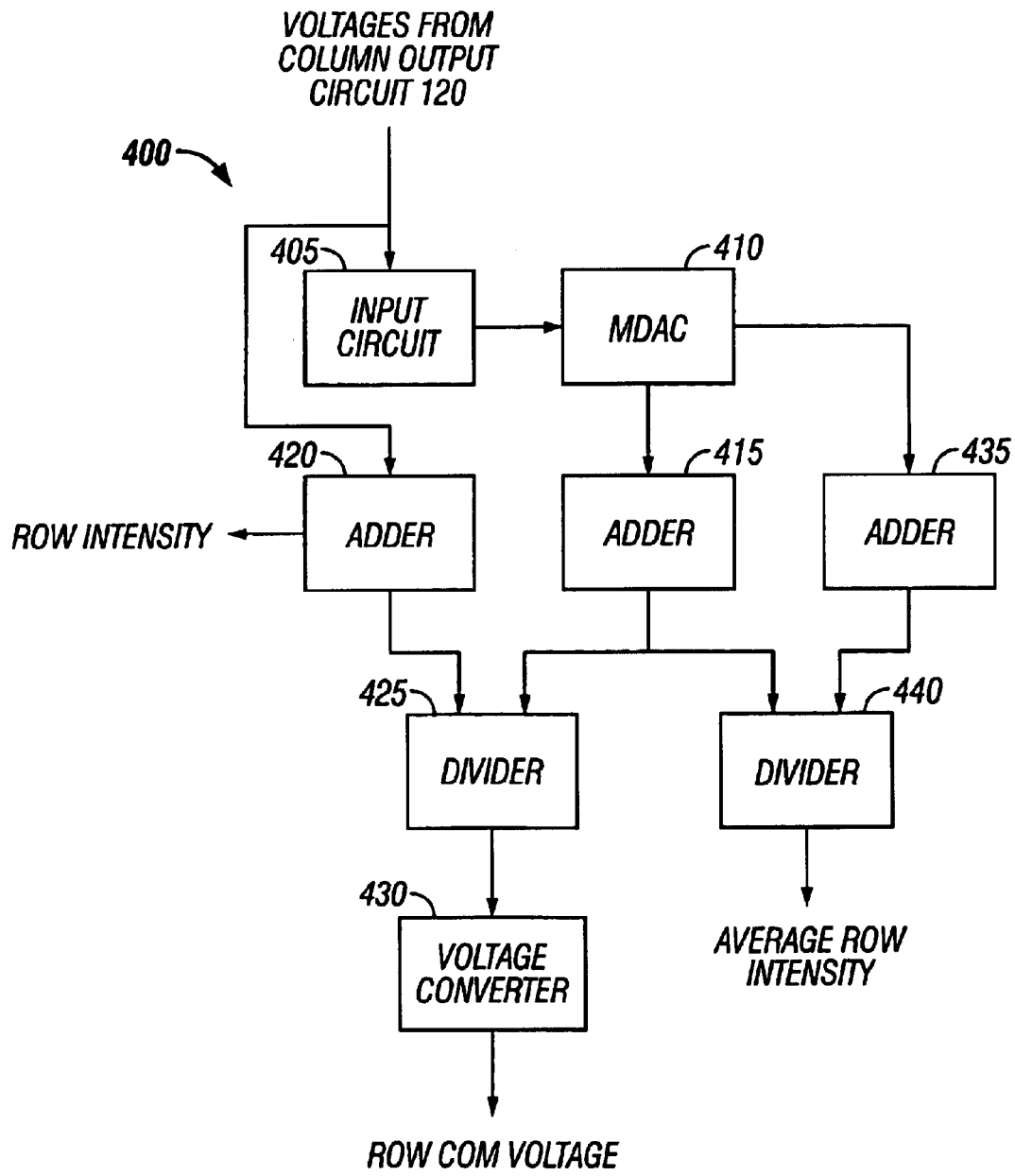
FIG. 4 is a block diagram of a digital center of mass circuit.

FIG. 4 shows an alternative implementation implementing a COM circuit 400 including digital circuitry. For a digital row COM circuit, as described above, column output circuit 120, shown in FIG. 1, outputs a plurality of voltages corresponding to elements in matrix 105 to COM circuit 400. An input circuit 405 includes an analog to digital converter and converts the voltages to digital brightness values representing the light intensity for each column in the selected row. Input circuit 405 also generates digital position values representing the relative location of each column in the selected row, such as 1 for the leftmost column, 2 for the next column, and so on.

Input circuit 405 supplies the brightness values and the position values to a multiplying digital to analog converter ("MDAC") 410. MDAC 410 generates a weighted current for each column by multiplying the corresponding brightness value by the corresponding position value. A first summation circuit 415 sums the weighted currents. A second summation circuit 420 converts the input voltages to brightness currents and sums those currents to generate the row intensity current. A first divider circuit 425 divides the sum of the weighted currents by the row intensity current to generate a row COM current. A voltage converter 430 converts the row COM current to a row COM voltage.

A third summation circuit 435 receives position currents from MDAC 410 representing the position values. Summation circuit 435 sums the position currents. A second divider circuit 440 divides the sum of the weighted currents from summation circuit 415 by the sum of the position currents from summation circuit 435 to generate an average intensity current. The average intensity current is used to determine the horizontal COM value.

A digital horizontal COM circuit is similar to the row COM circuit 400 shown in FIG. 4. A row COM current for each row, supplied by the digital row COM circuit, is multiplied by a corresponding average intensity current. This product is then divided by the sum of the average intensities to generate the horizontal COM value.

A digital vertical COM circuit is also similar to the row COM circuit 400 shown in FIG. 4. A row address value for each row is multiplied by the corresponding row intensity value. This product is divided by the sum of the row intensities to generate the vertical COM value.

In another alternative implementation, each of the digital COM circuits is more substantially digital with conversions occurring at the input and output. As above, a set of voltages corresponding to each of the elements in the selected row is converted to digital brightness values. Position values and address values are also generated. Each of the mathematical operations described above is performed on the digital values. At the end of each process a digital COM value may be converted to an analog COM voltage. Alternatively, the digital COM value can be used as a digital value.

In an alternative implementation, a COM circuit implemented using capacitor scaling may be used. The structure and operation of such a COM circuit is described by Shibata et al. in "Advances in Neuron-MOS Applications", ISSCC Proc., pp. 304–05, 1996, the disclosure of which is incorporated herein. A capacitor scaling COM circuit is limited to small applications with a relatively small number of inputs, as noted above. Thus, a capacitor scaling COM circuit may be used when the imager is small or only small windows are to be accessed.

Alternatively, capacitor scaling COM circuits may be included in an imaging system as a supplemental system. When a window is selected which is within the input limitation of the capacitor scaling COM circuits, these COM circuits may be used. When a larger window is selected, the COM circuits described above and shown in FIGS. 1–3 may be used. Because the capacitor scaling COM circuits are smaller they may be faster and more power efficient. This alternation between the two types of COM circuits may provide improved performance.

Additional variations and implementations are apparent to those of ordinary skill in the art. For example, alternative combinations of analog and digital circuitry may be implemented. The present disclosure is not limited by the embodiments described above, but only by the scope of the following claims.

What is claimed is:

1. An image sensor comprising:
   a plurality of photosensitive elements arranged in a matrix of M columns and N rows, where M>1 and N>1;
   a row center of mass circuit coupled to said photosensitive elements, said row center of mass circuit including a resistive network and a normalization circuit including at least one bipolar transistor, where the center of mass circuit identifies a center of mass row value in a selected row and identifies a row intensity for each row;
   a horizontal center of mass circuit coupled to the row center of mass circuit, where the horizontal center of mass circuit identifies a center of mass horizontal value relative to the matrix based upon the center of mass row values, such that the center of mass horizontal value indicates the horizontal coordinate of a center of mass location for the matrix as a whole; and
   a vertical center of mass circuit coupled to the row center of mass circuit, where the vertical center of mass circuit identifies a center of mass vertical value relative to the matrix based upon the row intensities, such that the center of mass vertical value indicates the vertical coordinate of the center of mass location for the matrix as a whole.

* * * * *

UNITED STATES PATENT AND TRADEMARK OFFICE
CERTIFICATE OF CORRECTION

PATENT NO.         : 6,980,230 B2                                    Page 1 of 1
APPLICATION NO.    : 10/289509
DATED              : December 27, 2005
INVENTOR(S)        : Orly Yadid-Pecht et al.

It is certified that error appears in the above-identified patent and that said Letters Patent is hereby corrected as shown below:

At page 1, please replace:

"(73) Assignee:    The United States of America as represented by the Administrator of the National Aeronautics and Space Administration, Washington, DC (US)"

with

--(73) Assignee:    California Institute of Technology, Pasadena, CA (US)--.

Signed and Sealed this

Thirteenth Day of July, 2010

David J. Kappos
*Director of the United States Patent and Trademark Office*